United States Patent [19]

Douglas

[11] 4,112,343
[45] Sep. 5, 1978

[54] BIDIRECTIONAL SELF BALANCING BRIDGE

[75] Inventor: Philip N. Douglas, Cary, N.C.

[73] Assignee: Cornell-Dubilier Electric Corp., Newark, N.J.

[21] Appl. No.: 791,554

[22] Filed: Apr. 27, 1977

Related U.S. Application Data

[63] Continuation of Ser. No. 545,146, Jan. 29, 1975, abandoned.

[51] Int. Cl.$^2$ .............................................. G05B 1/06
[52] U.S. Cl. .................................... 318/674; 318/663; 318/678
[58] Field of Search ................. 318/674, 678, 663; 323/75 E

[56] References Cited

U.S. PATENT DOCUMENTS

| 2,846,630 | 8/1958 | Boyle et al. | 318/678 |
| 3,297,923 | 1/1967 | Schneider et al. | 318/674 |
| 3,327,187 | 6/1967 | Schneider et al. | 318/674 |
| 3,496,384 | 2/1970 | Wright et al. | 318/678 X |
| 3,667,024 | 5/1972 | Deming | 318/674 |
| 3,742,327 | 6/1973 | Nettles | 318/678 |
| 3,935,524 | 1/1976 | Cap et al. | 318/678 X |

*Primary Examiner*—B. Dobeck

[57] ABSTRACT

The disclosed system includes a direct-current bridge circuit and a bridge-balancing reversible motor coupled to the bridge circuit, together with a differential high-gain amplifier which is responsive to even slight bridge unbalance to polarize the motor for rotation in the direction toward rebalance of the bridge circuit and also interrupts the motor operation when balance of the bridge is passed in either direction. Apparatus is included responsive to both positive and negative reversals in the polarity of unbalance of the bridge for deenergizing the motor when the null of the bridge is crossed in either direction.

25 Claims, 1 Drawing Figure

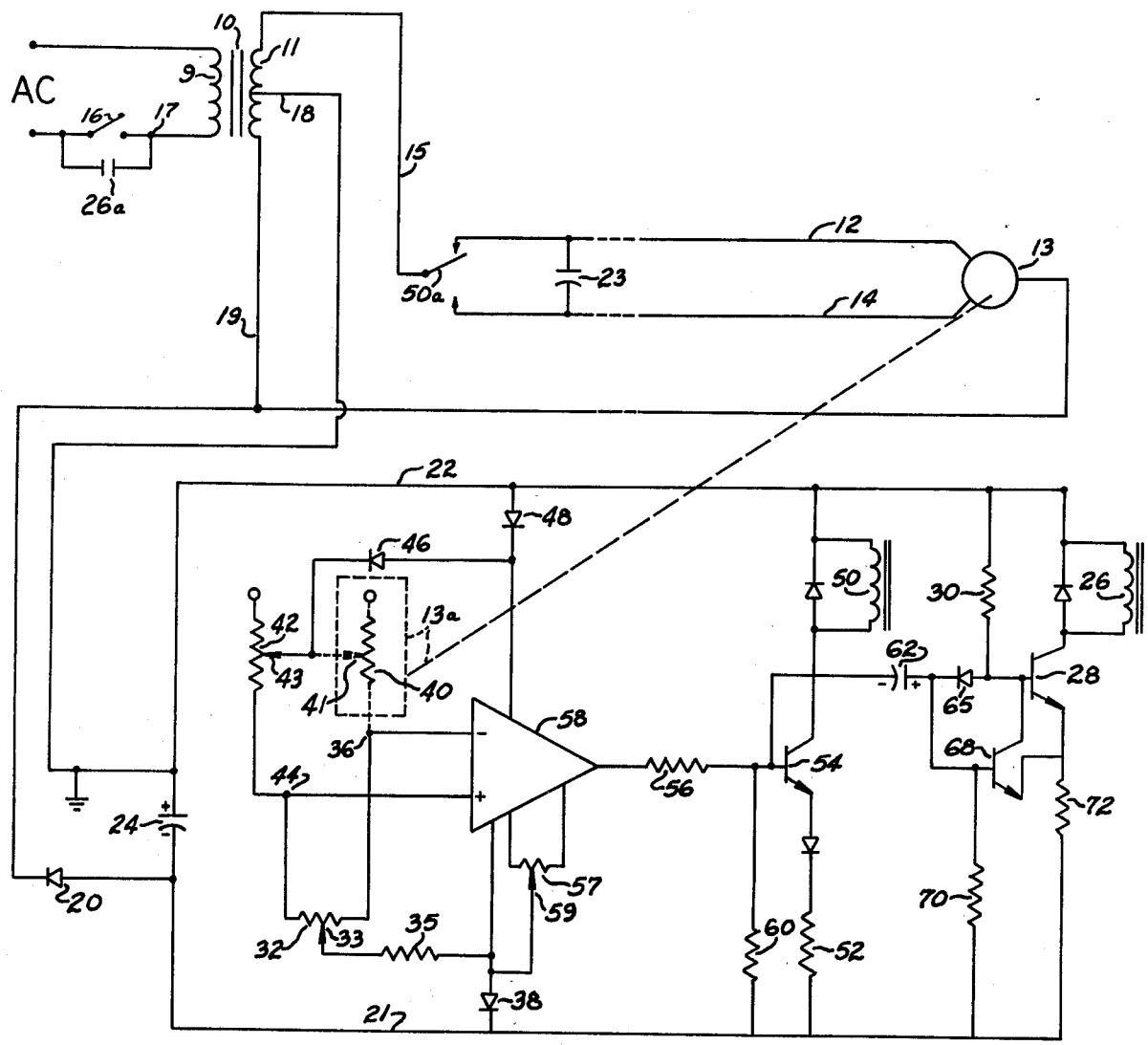

BIDIRECTIONAL SELF BALANCING BRIDGE

This invention relates to bridge circuits, and more particularly to servo systems involving self-balancing bridges. This application is a continuation of co-pending application Ser. No. 545,146, Filed Jan. 29, 1975, and now abandoned.

BACKGROUND OF THE INVENTION

In a particular application of the invention, as in the prior art, an antenna is mounted outside a building, and is motor-operated to assume a position corresponding to the setting of an electrical control. In a variety of servo systems for that purpose and others, the motor is reversible and operates an adjustable resistor representing the position of the antenna (or other device). The motor operates in one direction or the other as needed to restore bridge balance, and supply of power to the motor is interrupted when the output of the bridge indicates that the desired antenna position has been attained. Self-balancing direct-current bridges are well known, and have been used in antenna rotator systems. Several known systems are described, and a new version is disclosed in Deming, U.S. Pat. No. 3,667,024. This patent is incorporated herein by reference to the extent pertinent.

Several problems remain, however. In the patented device, two relays are used, one to control input power for the system, and the other to control the direction of the motor. The bridge and associated circuitry are so constructed that when the bridge reaches its balance point, ie., an actual null, the power control relay drops out and the system is de-energized. The power control relay must therefore reliably drop out before operation of directional relay (which either drops out or picks up, depending on the sense of the error being corrected) or the system may hunt, resulting in "flag waving" of the antenna. Deming solves this problem by specifying that the power control relay have a high dropout voltage relative to its pull-in voltage, and that the directional relay have a considerably lower dropout voltage compared to its pull-in voltage. Such relays can be expensive, which is a competitive disadvantage. Also, to the extent that aging, contamination or other factors reduce the dropout voltage of the power relay, the reliability in avoiding flag waving is degraded. Further, because the system is critically dependent on the electromechanical characteristics of the power relay as it responds to a bridge null, even if flag waving does not occur, there can be rather unpredictable accuracy variations as time passes.

Considerations such as described above have led to further developments, such as described in U.S. Patent application Ser. No. 467,883, filed May 8, 1974 to William Hohman, commonly assigned herewith. In that application, there is disclosed a system which utilizes a direct-current bridge circuit and responds not to the attainment of a null as has been common in the past, but to a "zero-crossing", that is, to a reversal of the polarity or sense of the error between the actual and desired positions of the mechanical system under control. Thus, rather than attempting to make the system come to rest in response to a given error, the system is brought to rest when the magnitude of the error starts to increase again.

In the Hohman device, the zero crossing itself is not sensed, but rather the rate of change of a signal representing position error. For this purpose, the DC bridge is coupled to a high gain differential amplifier operated "open loop", ie. having no degenerative or stabilizing feed-back. The amplifier provides a large output signal of one polarity virtually up to the point of true null and then reverses abruptly, to provide a large signal to opposite polarity (in relation to a mean potential of the system) as the sense of the error changes, and the magnitude begins to increase. The amplifier output is differentiated, and is utilized to interrupt operation of the motor.

In Hohman, one sense of reversal of the amplifier output is utilized only to reverse the motor. The next-following operation of the motor produces a motor-stopping sense of reversal of the amplifier output as null is again traversed, and the system coasts to rest after a limited angle of overtravel. With that form of control, the system always comes to rest after passing null in the same direction. Exacting standards of accuracy can be attained but the drive motor, with the inertia of the driven load, must be stopped and then reversed in direction in about half of the operations. The resulting increased "use" can affect the durability of the system, and must be taken into account in component design.

SUMMARY OF THE INVENTION

The self-balancing bridge described in detail below utilizes a direct-current bridge circuit and means responsive to the passing of balance of the bridge in either direction for stopping the associated motor. A high-gain differential amplifier provides a large output signal up to the point of true null and then reverses abruptly, changing the polarity of its output in relation to a mean potential as the polarity of unbalance of the bridge is reversed.

When balance of the bridge is passed in either direction the motor is polarized for reversal and its operation interrupted. As in the Hohman system, the amplifier output is differentiated, but a circuit is provided which is responsive to both positive and negative polarity reversals to de-energize the motor so the system comes to rest when the error begins to increase in either direction.

The following detailed description of an illustrative embodiment of the invention represents my presently preferred embodiment but it is evident that innumerable variations can be devised by those skilled in the art.

The FIGURE of the drawing represents a schematic diagram of a presently preferred form of my invention.

Referring now to the drawing, power transformer 10 having primary and secondary windings 9 and 11 is provided for coupling a conventional 110-volts $a$-$c$ source of power to the low voltage windings 12 and 14 of a reversible motor 13. In a typical application, motor 9 is arranged to rotate an antenna (not shown) into various angular positions as may be selected for best radio or television reception. A capacitor 23 is connected across windings 12 and 14 of the motor. A manual switch 16 in series with the transformer primary is spring-biased to be normally open, so that momentary actuation of the switch connects power terminal 17 to the $a$-$c$ source and energizes the transformer and the motor from the $a$-$c$ source. Alternating current of suitably low voltage is also supplied by a tap connection 18 on the secondary winding of the transformer through half-wave rectifier 20, for providing a direct-current circuit including bus 21, a smoothing capacitor 24 and grounded bus 22, as illustrated.

A first relay 26 is connected with a set of normally open contacts 26a in parallel with switch 16 to provide a holding circuit after switch 16 is released. A first transistor 28 is connected in a common emitter configuration in series with the winding of relay 26 and an emitter resistor 72 of small value. A resistor 30, connected to bus 22, provides positive d-c voltage to the base of transistor 28 with respect to its emitter, to bias the transistor into a sustained "on" state and to maintain relay 26 in its energized state.

From the circuit thus far described it is apparent that a closing of switch 16 energizes buses 21 and 22 and, without more, relay 26 becomes energized. Relay 26 remains energized until (as will be seen) a pulse of either polarity is applied to the base of transistor 28 of sufficient magnitude to turn it off. This, in turn, de-energizes relay 26 and allows contacts 26a to open. When that occurs (assuming that manually closed switch 16 has been released to open) power to the whole system is interrupted.

Error sensing is achieved by a d-c bridge circuit connected between bus 21 and bus 22 by like-poled diodes 38, 46 and 48 and resistor 35. This bridge circuit includes two variable resistors 40 and 42 connected at one end to opposite ends of variable resistor 32, and junctions 36 and 44 thereof constituting the output terminals of the bridge. The wipers 41 and 43 of variable resistors 40 and 42 are connected to the cathode of diode 46 and the other ends are unconnected. Variable resistor 40 is mounted on a shaft (not shown) which is driven by motor 13 as indicated by broken line representation 13a. Resistor 40 represents the position of the mechanical output device to be operated, such as an antenna. A manually adjustable control resistor 42 is connected in parallel with position-representing resistor 40. Adjustment of resistor 42 selects the desired antenna position. A compass rose, or other suitable angular reference is provided for user's convenience. The wiper 33 of variable resistor 32 is coupled to the anode of diode 38 by resistor 35. Resistors 40 and 42 determine the resistance of two arms of the bridge and the end portions of variable resistor 32 determine the resistance of the other two arms of the bridge. Terminals 36 and 44 constitute the output terminals of the bridge whose power input terminals are d-c busses 21 and 22, respectively. Variable resistor 32 is used to adjust the output of the bridge. Resistor 35 protects the variable resistors from damage should wipers 33, 41 and 43 all be positioned near the ends of the respective resistors when power is applied to the circuit.

A second relay 50 is provided to control the direction of rotation of motor 13. Relay 50 has single pole, double throw contacts 50a connected in series with windings 12 and 14 of the motor 13, respectively. A second transistor 54 is connected in common emitter configuration in a series circuit with the winding of relay 50 and emitter resistor 52 of small value between d-c busses 21 and 22. The base of transistor 54 is connected through resistor 56 to the output of a high-gain differential direct-current amplifier 58 whose differential input terminals are connected to the bridge output terminals 36 and 44. The base of transistor 54 has an a-c ground return resistor 60. A variable resistor 57 is connected across adjustment terminal of amplifier 58, with wiper 59 connected to negative bus 21 through diode 38 to provide compensation for zero offset voltage inherent in the amplifier.

A capacitor 62 which serves as a differentiator is connected in series with a forward biased diode 65 between output resistor 56 of amplifier 58 and the base electrode of transistor 28. A third transistor 68 is coupled with its collector-to-emitter output circuit across the base-to-emitter input circuit of transistor 28. A resistor 70 provides an a-c ground return for the base of transistor 68 and cooperates with resistor 30 to provide a voltage divider which holds transistor 28 normally conducting and transistor 68 normally non-conducting.

Amplifier 58 is advantageously constructed to exhibit extremely high gain so its output voltage is clamped near one or the other side of the power supply voltage, in this case, bus 21 or 22, for even a minute difference between the input signal levels. This may be achieved by connecting amplifier 58 in an open loop configuration with no stabilizing feedback. However, any other configuration providing a very reliable and unambiguous output signal change for an input signal sense reversal is equally satisfactory.

Amplifier 58 effectively digitizes the error signal, and advantage is taken of this in producing a reliable, yet relatively simple and inexpensive system. Equally important in that regard is the use of the time derivative of the error signal, i.e. its rate of change. As will be appreciated, differentiation enhances the abruptness of the sense transition of the error signal, and to some extent reduces the requirements for sharpness of the amplifier output transistor itself. The combination of high amplifier gain with rate of change sensing is preferred.

Capacitor 62 and its charging and discharging paths including resistors 60, 70 and 72 operate in response to the abrupt positive and negative going transistions in the output of amplifier 58 corresponding to the crossing of the null of the bridge in opposite directions to generate fairly sharp positive and negative pulses. Diode 65 and transistor 68 form current controlling means for disabling current conducting transistor 28 upon receiving positive and negative signal pulses from amplifier 58 through differentiating capacitor 62 corresponding to changes in the polarity of unbalance in the bridge.

The operation of the described circuit is as follows: Both the motor and the entire bridge circuit are normally de-energized, but become energized when switch 16 is manually closed. This switch opens as soon as pressure is released, but momentary closure of the switch is sufficient to energize relay 26 and close contacts 26a, as a holding circuit. This provides power for operating the motor, and it also provides d-c energization of busses 21 and 22. Depending on the position of dual position contacts 50a, the motor will run in one direction or the opposite direction, as is well known in the art.

The user will ordinarily adjust the position of a suitable control knob of resistor 42 of a desired antenna orientation in relation to a compass rose or other scale. Adjustment of resistor 42 normally causes the bridge to be unbalanced. Thus with busses 21 and 22 energized, amplifier 58 provides a strong output signal which is either close to the potential of d-c bus 22 ("high") or close to the potential of bus 21 ("low"). These potentials may be considered as of opposite sense or opposite polarity relative to a mean potential point of the system, e.g. terminal 36 or 44.

In the condition of the drawing as shown, relay contact 50a is closed to energize winding 12, and relay 50 is de-energized. This condition continues in effect for one sense of adjustment of resistor 42 relative to the previously existing adjustment of resistor 40 that represents the position of the antenna. In this condition, the output of the amplifier 58 is "low" and therefore transistor 54 is turned off. The motor continues to rotate the antenna and to adjust resistor 40 in the direction which is appropriate to restore balance of the bridge.

Due to the high gain of amplifier 58, the slightest adjustment of position-representing resistor 40 by the motor past null causes the amplifier output rapidly to switch to a high level. The base of transistor 54 likewise switches from low to high, causing the transistor conduct, and relay 50, to be energized. This reverses the contacts 50a so that winding 14 is energized instead of winding 12. At the same time, capacitor 62 applies a positive pulse to transistor 68 which saturates and removes the forward bias from the base-to-emitter input circuit of the normally-conducting transistor 28. Thus, even the slightest crossing of the null of the bridge causes transistor 28 to be turned off. This de-energizes relay 26 and the entire bridge circuit including motor 13 by opening contacts 26a in the a-c input power circuit. Accordingly, the whole system comes to rest with the antenna positioned at a point corresponding to slight unbalance of the bridge. This does not represent an acutal error, inasmuch as the calibration of the control knob of resistor 42 will take any such slight unbalanced condition of the bridge into account. The motor may be equipped with a brake (not shown) or other suitable means so as to minimize the travel of the motor and the antenna past the balance point of the bridge.

The bridge may be unbalanced by manipulating control resistor 42 in the direction opposite that considered above. In that condition of the bridge, as soon as switch 16 is closed and relay contacts 26a close, the output of amplifier 58 will go strongly "high" so that transistor 54 and relay 50 are energized. The condition of the contacts 50a that is represented in the drawing become reversed when relay 50 is energized, so that the motor operates the antenna and resistor 40 in the direction that will rebalance the bridge. As soon as the balance point of the bridge is crossed, the output of amplifier 58 is driven strongly negative and a negative pulse is applied to the base of transistor 28 via diode 65. This overcomes the normal positive bias and turns the transistor off. Relay 26 is de-energized, contacts 26a open, and power is interrupted both to the motor and to the bridge.

From the foregoing it is seen that the bridge always reaches a point which is slightly to one side or the other of its null point. When the motor stops, but responds in the proper direction the next time that control resistor 42 is adjusted and switch 16 is closed. Furthermore, since the control signal developed when the bridge passes through null is quite distinct and precise in timing, the system can easily be designed to provide the required accuracy in positioning the antenna or other device to be controlled.

The nature of the invention is such that the illustrative embodiments described above can be widely varied within the skill of the art and consequently the invention should be construed broadly consistent with its full spirit and scope.

What is claimed is:

1. A self-balancing direct current bridge system, including a mechanical output device; a position sensor coupled to said output device to provide a signal representing the actual position of said device; a reversible motor for operating said output device; a first relay effective when energized to connect said motor to a power source; means for energizing said first relay; a second relay arranged when de-energized to permit motor rotation in one direction and when energized to permit motor rotation in the opposite direction; direct-current bridge means; an output circuit for said bridge means; an adjustable control element to provide a signal representing a desired position for said output device, means coupling said actual and desired position signals in said bridge means whereby said bridge means is balanced when said position signals represent like desired and actual positions and is unbalanced otherwise; means connected to said bridge output circuit for selectivity energizing or deenergizing said second relay such that the motor operates to restore the bridge means to its balanced condition; said output circuit including means responsive to the rate of change of bridge balance to produce a control signal; and means responsive to any polarity reversal of the rate of change of bridge balance for de-energizing said first relay and thereby de-energizing said motor.

2. A self-balancing direct current bridge system in accordance with claim 1, wherein said means for de-energizing said first relay includes means to interrupt the current flow path of said relay whenever said control signal changes polarity.

3. A self-balancing direct current bridge system in accordance with claim 1, wherein said bridge output circuit includes a high-gain differential amplifier and the means for de-energizing said first relay includes series-coupled capacitance means.

4. A self-balancing bridge circuit in accordance with claim 1, wherein said bridge output circuit includes a high-gain direct-current amplifier and wherein said control signal generating means includes pulse generating means and wherein said means for de-energizing said first relay includes means separately responsive to positive and negative control signal pulses.

5. A self-balancing bridge circuit in accordance with claim 1, wherein said bridge output means inclues a differential high-gain direct-current amplifier whose output is at the positive or negative power supply level when the bridge circuit is even slightly unbalanced, the amplifier output being of one polarity or the opposite according to the polarity of said unbalance, and wherein said means for de-energizing the first relay includes means that are polarized and responsive to control signals corresponding to different directions of reversal of the output of the amplifier whereby the motor is de-energized in response to each polarity reversal.

6. A self-balancing bridge system in accordance with claim 1 wherein said position sensor is an adjustable resistor operated by said motor coordinately with the output device, and coupled into said bridge means, and wherein said adjustable control element is an adjustable resistor coupled into said bridge means.

7. A control system comprising a d-c bridge; an adjustable control resistance; an adjustable slave resistance; a motor for controlling the slave resistance; current conduction means for applying power to the motor, current controlling means maintaining said current conduction means normally conducting, a high-gain direct current amplifier hving an input circuit connected across the bridge; and differentiating means coupled between the amplifier output circuit and the current controlling means; said current controlling means including means for disabling the current conduction means responsive to both positive and negative transitions in the output of said differentiating means corresponding to the crossing of the null of the bridge in opposite directions.

8. A self-balancing bridge circuit as in claim 7 wherein said current conduction means comprises a relay having contacts for applying power to the motor.

9. A self-balancing bridge circuit as in claim 8 wherein said differentiating means includes a series capacitor whereby to generate positive and negative pulses responsive to positive and negative going transitions of the amplifier output for disabling the current conduction means.

10. A self-balancing bridge circuit as in claim 7 wherein the current controlling means includes means that are polarized and responsive to signals of different polarity received from the differentiating means for de-energizing the motor responsive to each polarity transition of the output of said amplifier.

11. A bridge circuit according to claim 7 wherein said current conduction means comprises a relay having contacts for applying power to the motor, wherein said current control means includes a polarity-sensitive switching device in series with the coil of said relay and means providing bias for maintaining said switching device in its relay-energizing state; wherein said differentiating means includes a capacitor coupled to the output of said amplifier, said current control device further including a second polarity sensitive device for removing the bias on said switching device in response to an output of said differentiating device corresponding to a crossing of the null of the bridge in one direction, and a third polarity sensitive device for removing the bias on said switching device in response to an output of said differentiating device corresponding to a crossing of the null of the bridge in the opposite direction.

12. A bridge circuit according to claim 11, wherein said switching device comprises a transistor, including a signal path defined by two terminals in series with said relay coil and a control input defined by a separate third terminal connected to said second and third polarity sensitive devices.

13. A bridge circuit according to claim 12, wherein said second polarity sensitive device comprises a diode coupled between said capacitor and said transistor control terminal.

14. A bridge circuit according to claim 7, further including motor reversing means for controlling the sense of adjustment of said slave resistance, including means responsive to a positive output of said amplifier to condition said motor for operation in one direction and responsive to a negative output of said amplifier to condition said motor for operation in the opposite direction.

15. A bridge circuit according to claim 14, wherein said motor reversing means comprises a relay having normally open and normally closed contact means connecting said motor to said power source for rotation in opposite directions, said relay being responsive to one polarity output of said amplifier to close said normally open contacts, but remaining unenergized in response to the opposite polarity output of said amplifier.

16. A d-c feedback control system including a mechanical output device; a power source; reversible drive means for said output device operable by said power source; first switch means effective when energized to maintain said power source in operation; means for energizing said first switch means; second switch means operative when de-energized to permit operation of said drive means in one direction and when energized to permit operation of said drive means in the opposite direction; first means to generate a d.c. signal representative of the desired position of said output device; second means to generate a d-c signal representative of the actual position of said output device; circuit means providing a first output when said d-c signals represent one sense of difference between the desired and actual positions of said output means, and for providing a second output when the d-c isgnals represent the opposite sense of difference between the desired and actual positions of said output means; differentiating means coupled to the output of said circuit means; means responsive to the first output of said circuit means to de-energize said second switch means and responsive to the second output of said circuit means to energize said second switch means; and means responsive to an output of said differentiating means corresponding to reversal of the polarity of the circuit means output in either direction for de-energizing said first switch means and thereby deactivating said power supply.

17. A feedback control system according to claim 16, wherein said drive means comprises a reversible motor; and wherein said second switch means comprises a relay having first and second contact means, said first contact means coupling said power source to said motor for operation in one direction, and said second contact means coupling said power source to said motor for operation in the opposite direction.

18. A control system according to claim 16, wherein said first switch means comprises a relay with a normally open contact pair through which power is supplied to the remainder of the system, the energizing means coupling said relay coil to said power supply; and means for by-passing the normally open relay contacts for at least long enough to allow the relay to be energized.

19. A control system according to claim 18, wherein said by-passing means comprises a manually operable momentary contact switch.

20. A control system according to claim 18, wherein said differentiating means comprises a series capacitor, and wherein said means for de-energizing said first switch means comprises means for disconnecting the coil of said relay from said power supply.

21. A control system according to claim 20, wherein said first means to generate a d-c signal representative of the desired position of said output device comprises an adjustable resistor; and wherein said second means to generate a d-c signal representative of the actual position of said output device comprises an adjustable resistor connected to said output device and arranged for adjustment in accordance with motion of said output device.

22. A control system according to claim 21, wherein said circuit means comprises a d-c bridge including said adjustable resistors and further means responsive to even a small bridge unbalance of one polarity to provide said first output and responsive to even a small bridge unbalance of the opposite polarity to provide said second output.

23. A control system according to claim 22, wherein said further means comprises a high gain d-c differential amplifier connected in open loop configuration.

24. A control system according to claim 17, wherein said means to energize and de-energize said second switch means comprises a transistor having a signal path connected in series with said relay coil, and having a control terminal coupled to the output of said circuit means.

25. A control system according to claim 16, wherein said means for de-energizing said first switch means comprises a transistor having its current path connected to energize said first switch means, a control terminal means connected to said control terminal for biasing said transistor into conduction when said system is energized, and first and second polarity sensitive means connected to said differentiating means and each responsive to an output from said differentiating means of different polarity for overcoming the bias at said transistor control terminal.

* * * * *